United States Patent [19]

Tikkanen

[11] Patent Number: 4,876,008
[45] Date of Patent: Oct. 24, 1989

[54] SIEVE PLATE

[75] Inventor: Tim Tikkanen, Benalmadena, Spain

[73] Assignee: Panel International Ltd. p.l.c., London, England

[21] Appl. No.: 254,043

[22] Filed: Oct. 6, 1988

[51] Int. Cl.$^4$ ............................................. B01D 39/10
[52] U.S. Cl. ................................... 210/498; 209/397; 162/357
[58] Field of Search ............ 210/162, 483, 498, 500.1; 29/163.8, 163.6; 219/121.67, 121.68, 121.7, 121.73; 162/251, 357; 209/397

[56] References Cited

U.S. PATENT DOCUMENTS

| 239,837 | 4/1881 | Pinder et al. | 209/397 |
| 1,467,759 | 9/1923 | Hall | 209/397 |
| 1,940,952 | 12/1933 | Hutchens | 210/498 |
| 3,909,400 | 9/1975 | Seifert | 209/397 |
| 4,276,159 | 6/1981 | Lehman | 209/397 |
| 4,302,333 | 11/1981 | Cosack et al. | 210/498 |
| 4,317,023 | 2/1982 | Gryskiewicz | 219/121.67 |
| 4,795,560 | 1/1989 | Chupka et al. | 210/498 |

Primary Examiner—W. Gary Jones
Assistant Examiner—Matthew O. Savage
Attorney, Agent, or Firm—Dallett Hoopes

[57] ABSTRACT

The sieve plate herein is formed of plate or sheet material into which relatively wide grooves, having a flat bottom 4 mm wide, are formed on one side to within 1 mm of the opposite side. Through this remaining membrane wall openings are formed having a width of about 1 mm. The small openings may either be spaced circular perforations or slots. The slots may be in zig-zag formation. Zig-zag formations are preferred because it maximizes the filtering area.

3 Claims, 5 Drawing Sheets

SIEVE PLATE

BACKGROUND OF THE INVENTION

1. Field of the Invention

This invention relates to a sieve or filter plate having a number of perforated or slotted areas. More specifically, this invention relates to such a plate in which relatively broad grooves are formed in the downstream side and the remaining floor or membrane is pierced by slots or perforations. The upstream side of the screen therefore only sees the slots or perforations, and because the membrane is thin, there is little chance for the slurry or mixture being filtered to become lodged in the plate and clog it up.

2. Description of the Prior Art including Disclosure Statement under §1.97 and 1.99

Sieve and filter elements are used in various industries, mainly in chemical and petrochemical plants, in paper and pulp mills and in the food and pharmaceutical industries and machinery.

Traditionally, the sieve elements consists of wire mesh screens, simple perforated and slotted sieve plates or fibre-based filter or screen elements. The known disadvantages in the existing machines are easy clogging and high pressure drop while pumping. Additional disadvantages are the wear and tear of the elements and contamination of the industrial process.

It is old to form perforations in filter plate by having the sides of the perforations diverge toward the downstream side of the plate. An example is disclosed in U.S. Pat. No. 4,317,023 which issed Feb. 23, 1982 to Gregory A. Gryskiewicz.

SUMMARY OF THE INVENTION

The present invention aims at creating a screening element with which superfine particles can be screened with a very good mechanical resistance against the wear and tear on the element. The present sieve features grooves with slotted, perforated or the like areas in the bottom.

Especially preferred is the embodiment in which the cut-through area is of zig-zag form. In this modification the pass-through area can be enlarged compared to the area, for instance, where the slot is linear. The zig-zag figure can even be made more effective by putting a double zig-zag in the grooved area, thus practically maximizing the cut-through area and maximizing the filter area.

In one modification of the invention the slots in laterally adjacent grooves are inclined in the opposite directions so that the slots in the two grooves are in zig-zag formation.

The cut-through area may be a slot. It can also be perforations or the like or confirm many other forms and figures. An essential feature is fact that a maximized cut-through, or pass-through area is gained without weakened essentially the mechanical strength of the screen plate. Therefore, the plates of the invention are extremely durable, do not clog readily and offer reduced throughput resistance.

BRIEF DESCRIPTION OF THE DRAWINGS

The invention is explained more precisely referring to the following specification and drawings, all of which disclose nonlimiting embodiments of this invention. In the drawings.

DESCRIPTION OF THE PREFERRED EMBODIMENTS

Figure 1:
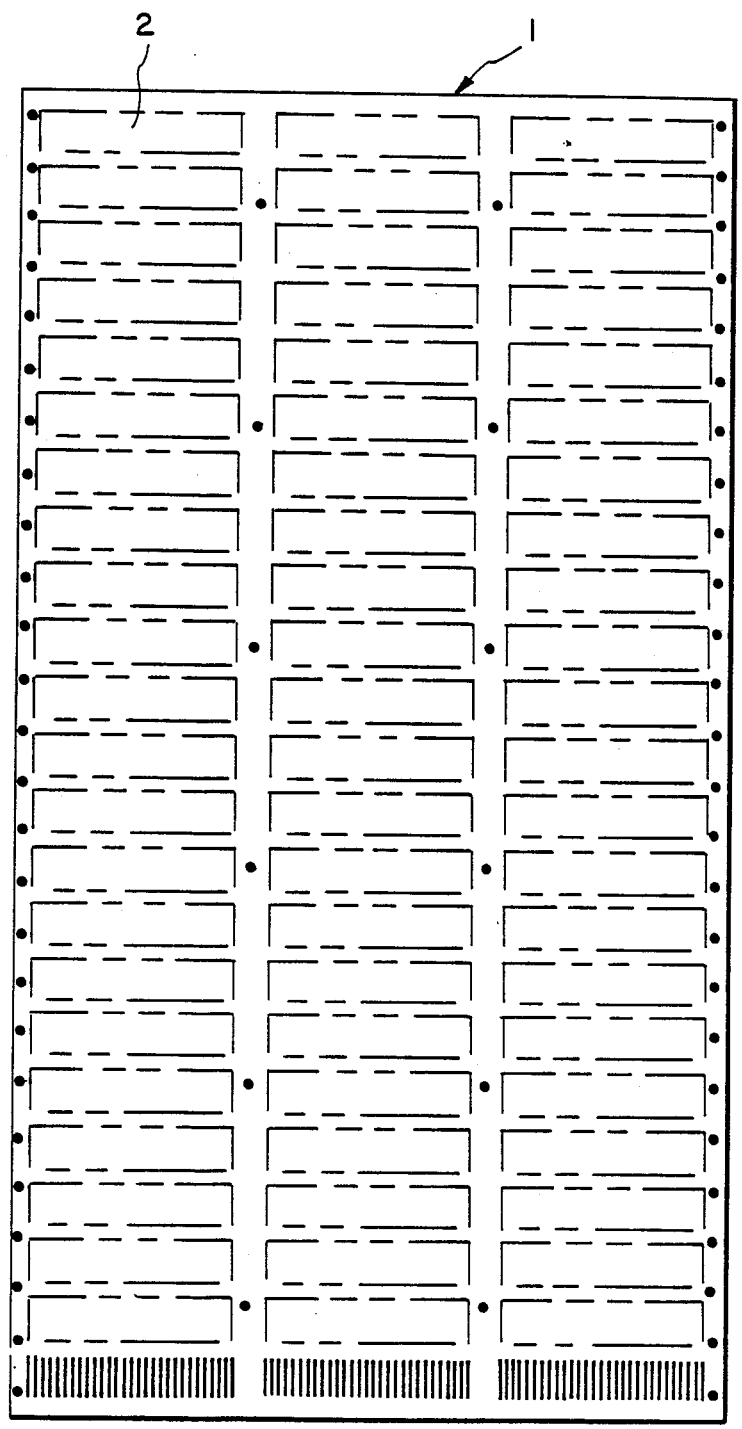
FIG. 1 is a side elevational view of a sieve or filter plate according to one embodiment of the invention.
Figure 2:
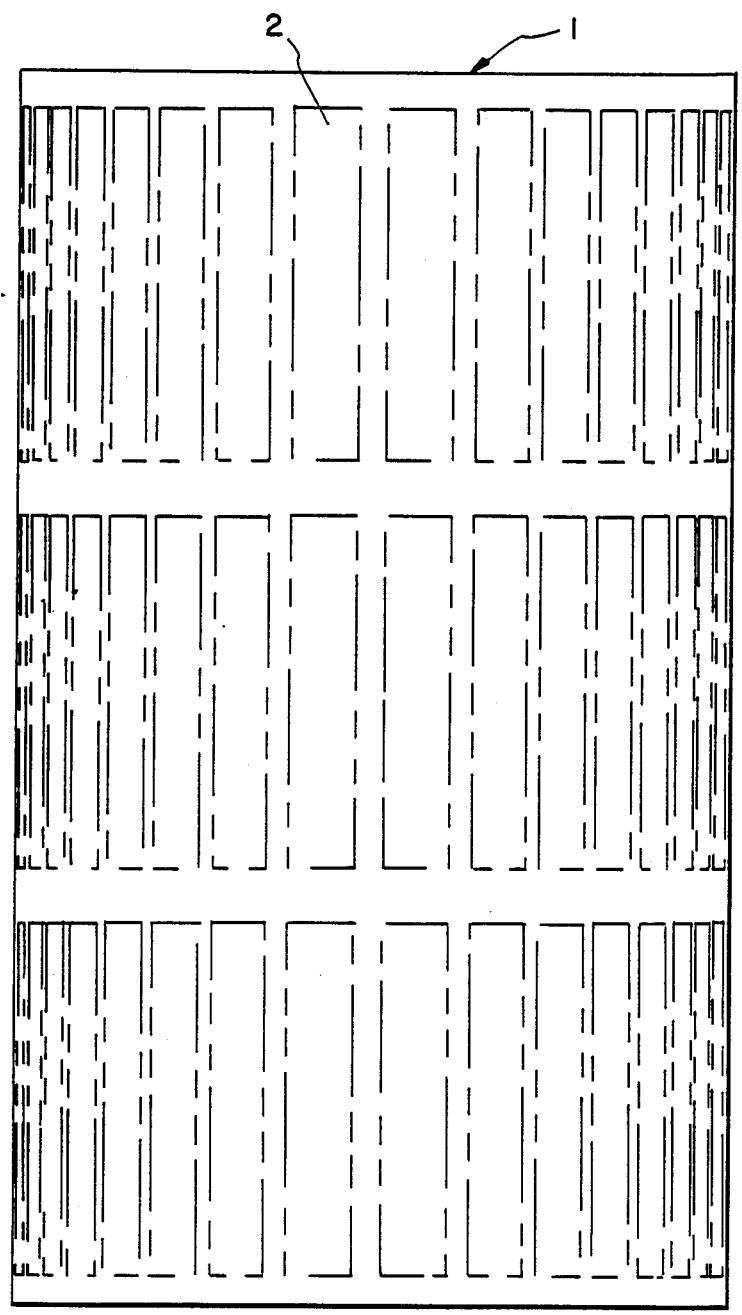
FIG. 2 is an elevational view of a plate in FIG. 1 rolled into a drum.

In FIG. 1 is shown a plate embodying the invention. It consists of a rectangular plate or sheet of metal or plastic 1 which has on the sides and in the middle for mounting elements, e.g. screws and bolts, perforations (shown as black spots in FIG. 1). In the bottom of the plate there are three rectangular areas consisting of black lines. These relatively thick black lines represent grooves 2 according to the invention. Other groove groups have been shown in FIG. 1 simply in the form of blocked-out areas. Thus, according to Fiugre 1 the sieve plate consists of a rectangular plate which on one side has grooves. The grooves do not extend entirely through the plate 1.

The grooves have been grouped in such a manner that in one plate 1 there are, for example, three spaced aligned groups horizontally disposed in the plate. The groups repeat upward as shown. In the described embodiment there are in each vertical group 23 grooves which number, of course, can vary accodingly to suit the dimensions of the plate.

Figure 3:
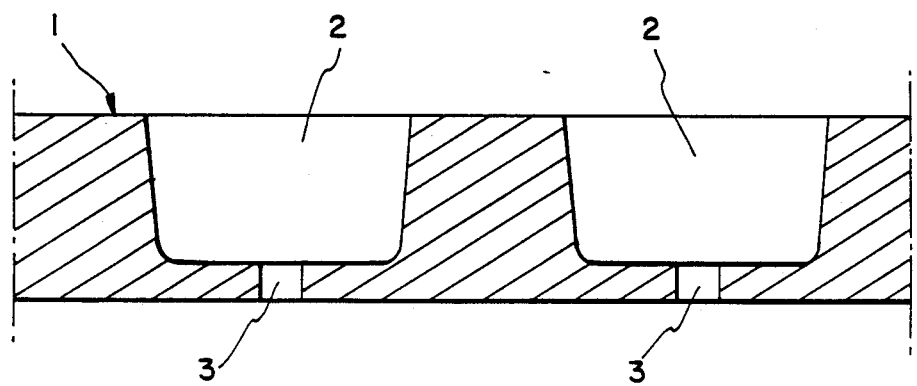
FIG. 3 is an enlarged fragmentary sectional view of adjacent grooves in the plate showing the grooves and the openings to give a relative size idea of both.

In FIG. 3 there is shown more precisely as an enlarged cross-section a detail of the plate 1 and the groove 2 made to its one surface as well as the opening 3 cut through the bottom of the groove, through the remaining thin wall.

The grooves 2 are placed in the plate in such a manner that inbetween the grooves remains sufficient unopened area to maintain the mechanical strength of the plate.

Specifically, in an acual preferred embodiment the plate thickness is 3 mm, the groove 2 opening 4.5 mm, the groove floor or bottom is 4 mm wide and the remaining floor or membrane is 1 mm. The width of the cut-through area 3 in the wall at the bottom of the groove is 0.01 to 1 mm. The horizontal measure between two aligned horizontal grooves 2 (FIG. 1) is 2.6 mm in one group. The distance horizontally between each groove group in the plate is about 15 mm and the vertical distance between the rows formed of the group of grooves is about 30 mm. In one row of the group of grooves there are 23 of them.

The above given figures and measure are naturally given merely as examples of one embodiment of the invention. The invention can naturally be modified in various ways.

Figure 4A:
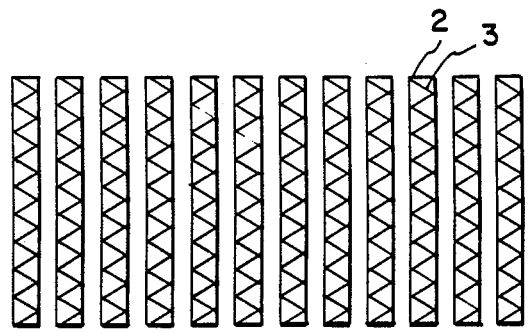
FIGS. 4a, b and c show three alternative patterns for the cut-through area.
Figure 4B:
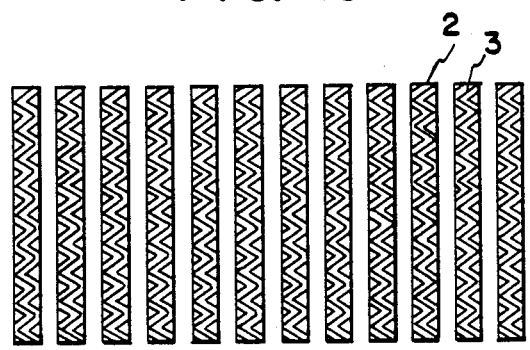
Figure 4C:
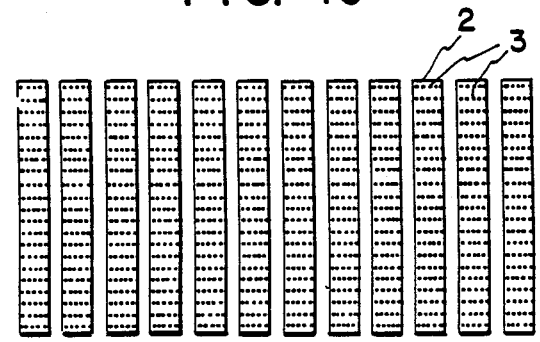

In FIGS. 4a, b and c are shown three alternatives for the slot-patterns of the groove bottom. FIGS. 4a shows a zig-zag-formed slot covering the whole groove. In FIG. 4b this zig-zag slot 3 has been formed with paired zig-zag slots and, finally, in FIG. 4c the bottom face of the groove is perforated. It should be poined out that the different shapes of slotting shown in the figures are only examples of the used forms. The cutting-through technique can be different, the figure can vary and the density and size of the holes or slots can be altered as well.

Figures 5, 6:
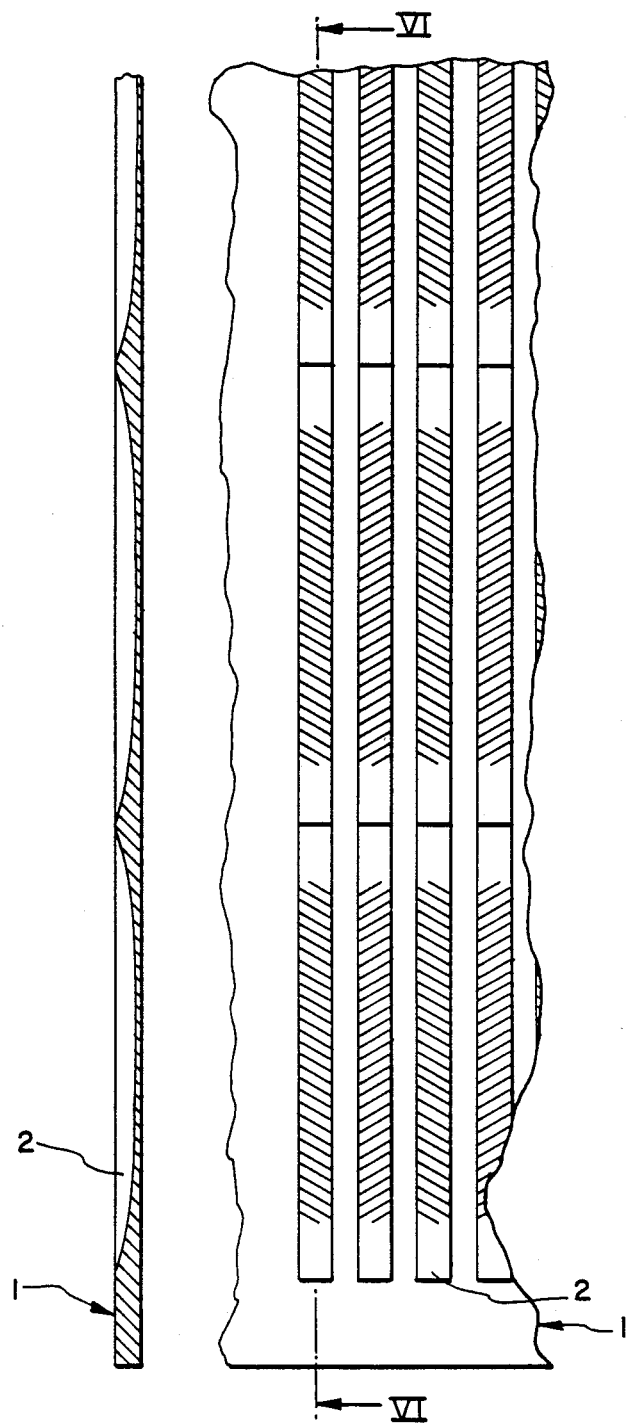
FIG. 5 shows one additional alternative for the cut-through area according to this invention.
FIG. 6 is a cross-section along the line VI—VI of FIG. 5.

In FIGS. 5 and 6 is shown one more form in which a groove has been formed in plate 1 in such a manner that the groove ends each thus leave unopened material between the grooves as described earlier. Seen in sections the grooves 2 form a kind of shallow arcuate grooving. The bottom of the groove 2 has linear slots 3 inclined in parallel disposition. Vertically in the plate the slots of the neighbouring grooves are however, inclined in the opposite way. Thus, vertically in the plate the overall figure of the slots in adjacent grooves are thus in zig-zag pattern. The embodiment of FIGS. 5 and 6 is different from earlier described embodiments in such a manner that it has only one continuous groove 2 into which the slots have been made. In contrast, in the other embodiments (FIG. 1) there is one groove for each group of slots and the grooves are endwise spaced (by about 15 mm in the above example).

It should be clear from the above description that of the groove 2 is made in the reverse or downstream side of the plate. This prevents the sieve plate from clogging. The groove is sufficiently wide that larger solids from the process stream cannot accumulate to clog the machine. Such clogging is the case in ordinary sieve plates where a simple hole or corresponding slot is made to the plate. Such slots are more easily clogged because the slot is in a relatively thick wall. In the present invention the perforation or slot 3 is relatively short (the thickness of the floor of the groove 2) and clogging is eliminated. Notwithstanding the presence of the grooves, the mechanical strength of the plate is maintained because there is much ungrooved area (FIG. 3).

Preferably the plate or sheet material of the embodiments are of metal, 316 and 304 stainless steel being preferred. The grooves 2 are preground in the blank and then the slots or perforations are preferably cut by laser. High pressure water or gas jet have also been used. Slot fineness under 100 micron (0.1 mm or 0.004") has been achieved.

While the invention has been disclosed in a limited number of forms, further variations are possible, and the extent of coverage sought should not be limited by the specific embodiments disclosed. Therefore, the invention may be defined by the following claim language and reasonable equivalents thereof.

What is claimed is:

1. A screen plate which has a number of cut-through areas and comprises a surface of the screen plate formed with grooves each groove having a bottom surface, said bottom surfaces having said cut-through areas in the form of zig-zag shaped slots.

2. A sieve plate adapted to be placed across a flow of slurry and defining downstream and upstream sides, said sieve plate comprising a sheet of metal formed with a plurality of spaced relatively broad grooves on the downstream side, the thickness of the sheet measured from a bottom surface of said groove to the upstream side of the plate being about 1 mm, the sheet also being formed with a plurality of elongate slots through the sheet at the bottom surface of the grooves, the slots being of a width of about 0.05 to 1 mm, the slots being arranged in a zig-zag fashion in the individual grooves.

3. A sieve plate adapted to be placed across a flow of slurry and defining downstream and upstream sides, said sieve plate spaced parallel relatively broad grooves on the downstream side, the thickness of the sheet measured from a bottom surface of a groove to the upstream side of the plate being about 11 mm, the sheet also formed with a plurality of slots through the sheet at the bottom surface of the grooves, said slots within each respective groove being parallel to each other, the slots being inclined with respect to the direction of the grooves and of width of between 0.05 t 1 mm, the slots in neighboring grooves being of opposite inclination.

* * * * *